(12) United States Patent
Imai et al.

(10) Patent No.: US 8,030,864 B2
(45) Date of Patent: Oct. 4, 2011

(54) MOTOR DRIVE CIRCUIT

(75) Inventors: Toshiyuki Imai, Oizumi-machi (JP); Takahiro Iida, Oizumi-machi (JP); Joji Noie, Ota (JP)

(73) Assignees: Sanyo Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 362 days.

(21) Appl. No.: 12/483,168

(22) Filed: Jun. 11, 2009

(65) Prior Publication Data

US 2010/0033118 A1 Feb. 11, 2010

(30) Foreign Application Priority Data

Jun. 20, 2008 (JP) ................. 2008-162235

(51) Int. Cl.
*H02P 6/16* (2006.01)
(52) U.S. Cl. ......... 318/400.04; 318/400.01; 318/400.06; 318/601; 318/607; 318/608; 318/700
(58) Field of Classification Search ............ 318/400.01, 318/400.04, 400.06, 601, 607, 608, 700
See application file for complete search history.

(56) References Cited

U.S. PATENT DOCUMENTS

| | | | | |
|---|---|---|---|---|
| 4,354,145 A | * | 10/1982 | Janssen | 318/400.38 |
| 4,356,437 A | * | 10/1982 | Saito et al. | 318/400.2 |
| 4,562,386 A | * | 12/1985 | Goff et al. | 318/400.04 |
| 4,658,190 A | * | 4/1987 | Miyazaki et al. | 318/400.23 |
| 5,182,500 A | * | 1/1993 | Shimada | 318/400.04 |
| 5,237,247 A | * | 8/1993 | Naito | 318/400.04 |
| 5,414,331 A | * | 5/1995 | Izawa et al. | 318/400.38 |
| 5,852,349 A | * | 12/1998 | Choi | 318/400.2 |
| 5,969,489 A | * | 10/1999 | Itou et al. | 318/400.04 |
| 2007/0046229 A1 | | 3/2007 | Ogino et al. | 318/268 |
| 2009/0140677 A1 | * | 6/2009 | Imai | 318/400.06 |

FOREIGN PATENT DOCUMENTS

JP 2002325479 A * 11/2002
JP 2004-166379 6/2004

* cited by examiner

*Primary Examiner* — Walter Benson
*Assistant Examiner* — Kawing Chan
(74) *Attorney, Agent, or Firm* — SoCal IP Law Group LLP; Stephen C. Sereboff; John E. Gunther

(57) ABSTRACT

A motor drive circuit includes a first amplifier circuit to amplify a difference between first and second position detection signals with a gain becoming smaller according to drop in power supply voltage, to output a first amplification signal, the first and second position detection signals being signals indicating a rotational position of a rotor in a motor, having a frequency corresponding to a rotation speed of the motor, and being opposite in phase to each other; a second amplifier circuit to amplify the difference between the first and second position detection signals with the gain, to output a second amplification signal opposite in phase to the first amplification signal; and a drive circuit to amplify the difference between the first amplification signal and the second amplification signal with a predetermined gain to be saturated at the power supply voltage, to output a driving voltage for driving the motor.

3 Claims, 5 Drawing Sheets

MOTOR DRIVE CIRCUIT

CROSS-REFERENCE TO RELATED APPLICATION

This application claims the benefit of priority to Japanese Patent Application No. 2008-162235, filed Jun. 20, 2008, of which full contents are incorporated herein by reference.

BACKGROUND OF THE INVENTION

1. Field of the Invention

The present invention relates to a motor drive circuit.

2. Description of the Related Art

In electronic equipment such as a notebook computer, a fan motor is used for cooling a heat-producing component such as a processor. When driving the fan motor, there may be employed a motor drive circuit that gradually changes a driving voltage of a motor coil in order to reduce noise in the fan motor (See Japanese Patent Laid-Open Publication No. 2004-166379, for example.)

FIG. 4 is a diagram illustrating an example of a configuration of a motor drive circuit for driving a single-phase fan motor. A motor drive circuit 100 controls driving voltages VOUT1 and VOUT2 for driving a motor coil L according to hall signals VH1 and VH2 opposite in phases to each other, which signals indicate a rotational position of a rotor in the motor and are output from a hall element 210. The driving voltages VOUT1 and VOUT2 are voltages to be respectively applied to terminals OUT1 and OUT2 to which the motor coil L is connected. A power supply circuit (REG) 200 generates a predetermined voltage to be supplied to the hall element 210. The hall element 210 outputs the sinusoidal hall signals VH1 and VH2 at a predetermined level having a frequency corresponding to a rotation speed of the fan motor. The hall signal VH1 is input to a resistor 230 connected to an inverting input terminal (hereinafter referred to as negative input terminal) of an operational amplifier 220, while the hall signal VH2 is input to a non-inverting input terminal (hereinafter referred to as positive input terminal) of the operational amplifier 220. Gate voltages of an NMOS transistor 250 and a PMOS transistor 260 for directly driving the motor coil L are changed according to an output of the operational amplifier 220. An inverter 240 is a buffer for driving the NMOS transistor 250 and the PMOS transistor 260. Drain voltages of the NMOS transistor 250 and the PMOS transistor 260 become a driving voltage VOUT1 to be applied to the terminal OUT1. The driving voltage VOUT1 is fed back to the negative input terminal of the operational amplifier 220 through a resistor 270. Therefore, as shown in FIG. 5, the driving voltage VOUT1 is a voltage obtained by amplifying a difference between the hall signals VH1 and VH2 with a gain corresponding to a ratio between the resistor 230 and the resistor 270. Here, the gain determined by the resistors 230 and 270 are set sufficiently great, so that a maximum value of the driving voltage VOUT1 is saturated at a power supply voltage VDD. The driving voltage VOUT2 to be applied to the terminal OUT2 is controlled so as to become opposite in phase to the driving voltage VOUT1 according to the hall signals VH1 and VH2.

As mentioned above, the motor drive circuit 100 gradually changes the driving voltages VOUT1 and VOUT2 according to the hall signals VH1 and VH2, and thus, the noise of the fan motor can be reduced.

In the motor drive circuit 100, it is required to change a level of the power supply voltage VDD in order to control the rotation speed of the fan motor. In more detail, if the power supply voltage VDD is lowered, the maximum voltage of the driving voltage VOUT1 is lowered, and thus, the rotation speed of the fan motor is decreased. On the other hand, if the power supply voltage VDD is raised, the maximum voltage of the driving voltage VOUT 1 is increased, and thus, the rotation speed of the fan motor is increased. If the power supply voltage VDD is lowered in order to decrease the rotation speed of the fan motor, the gain determined by the resistors 230 and 270 is constant, and thus, a proportion of the rise time and fall time is decreased in the driving voltage VOUT1. Therefore, when the power supply voltage VDD is low, the driving voltage VOUT1 gets close to a square wave, and the noise when the fan motor is driving is increased. On the other hand, if the power supply voltage VDD is raised in order to increase the rotation speed of the fan motor, the proportion of the rise time and fall time is increased in the driving voltage VOUT1. When the driving voltage VOUT1 is at a level of an intermediate voltage VDD/2 of the power supply voltage VDD, for example, the NMOS transistor 250 and the PMOS transistor 260 are both turned on. That is, in the driving voltage VOUT1, when the proportion of the rise time and fall time is increased, time gets longer during which the NMOS transistor 250 and the PMOS transistor 260 are both ON, and consumption current of the motor drive circuit 100 is increased. If the proportion of the rise time and fall time in the driving voltage VOUT1 is changed according to change of the power supply voltage VDD as above, problems occur such as increase in noise and increase in consumption current.

SUMMARY OF THE INVENTION

A motor drive circuit according to an aspect of the present invention, comprises: a first amplifier circuit configured to amplify a difference between first and second position detection signals with a gain becoming smaller according to drop in power supply voltage, to output a first amplification signal, the first and second position detection signals being signals indicating a rotational position of a rotor in a motor, having a frequency corresponding to a rotation speed of the motor, and being opposite in phase to each other; a second amplifier circuit configured to amplify the difference between the first position detection signal and the second position detection signal with the gain, to output a second amplification signal opposite in phase to the first amplification signal; and a drive circuit configured to amplify the difference between the first amplification signal and the second amplification signal with a predetermined gain so as to be saturated at the power supply voltage, to output a driving voltage for driving the motor.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
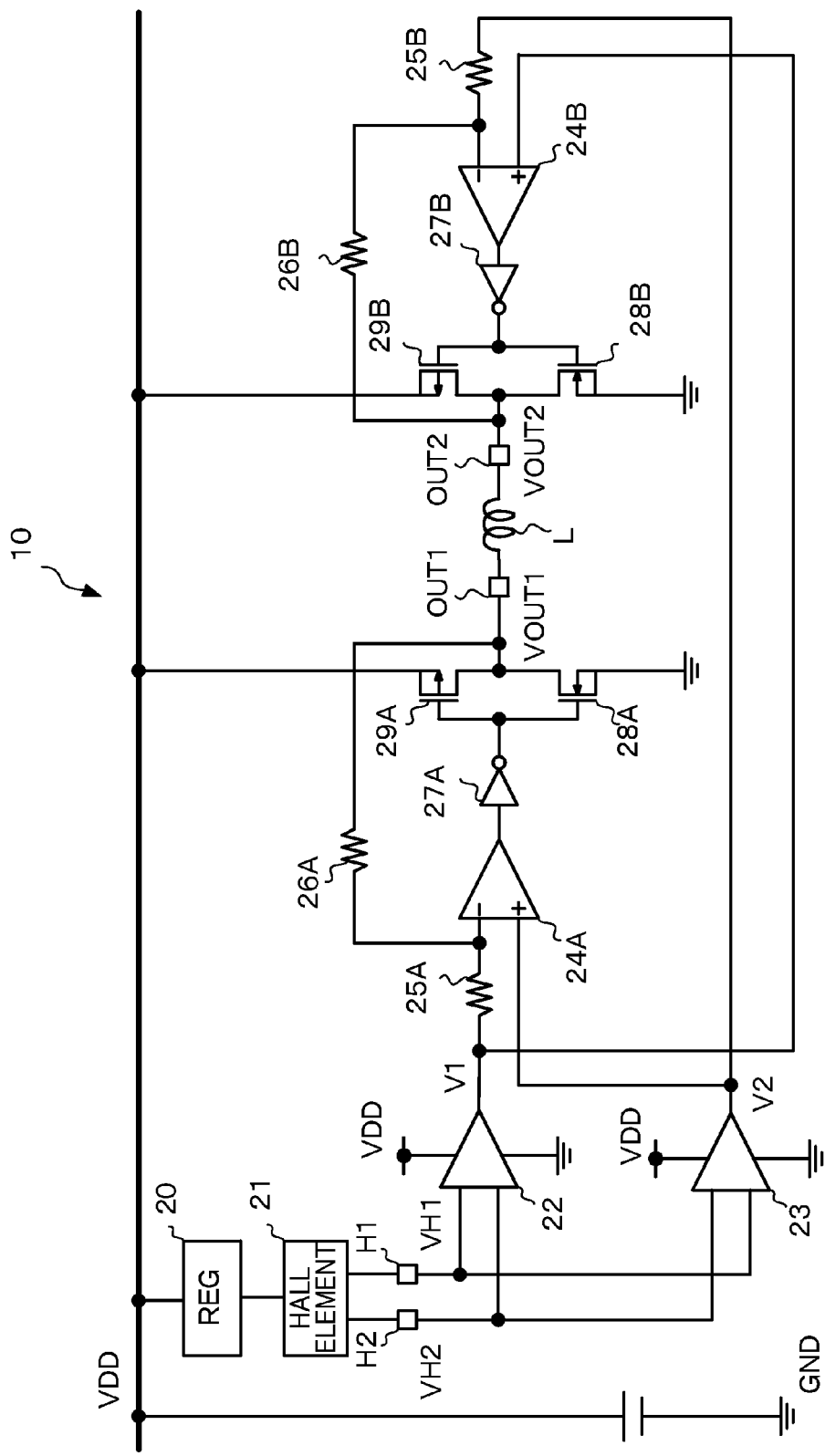
FIG. 1 is a diagram illustrating a configuration of a motor drive circuit 10 according to an embodiment of the present invention.

FIG. 1 is a diagram illustrating a configuration of a motor drive circuit 10 according to an embodiment of the present invention. The motor drive circuit 10 is, in electronic equipment such as a notebook computer, for example, incorporated in a fan motor for cooling a heat-producing component such as a processor and is used for driving a motor for rotating a fan for cooling.

The motor drive circuit 10 according to an embodiment of the present invention is a circuit for driving a single-phase fan motor so as to become at a rotation speed according to a level of a power supply voltage VDD, and includes amplifier circuits 22, 23, operational amplifiers 24A, 24B, resistors 25A, 25B, 26A, 26B, inverters 27A, 27B, NMOS transistors 28A, 28B, and PMOS transistors 29A, 29B. In an embodiment according to the present invention, the motor drive circuit 10 is integrated, a motor coil L is connected between terminals OU1 and OUT2, and a hall element 21 for outputting hall signals VH1 (first position detection signal) and VH2 (second position detection signal) according to a rotational position of a rotor in the motor is connected between terminals H1 and H2. The hall element 21 is supplied with a predetermined voltage generated by a power supply circuit (REG) 20, to output the hall signals VH1 and VH2 which have such a frequency that is changed according to the rotation speed of the fan motor and which are opposite in phase to each other. The hall signals VH1 and VH2 according to an embodiment of the present invention are sinusoidal signals having an amplitude of a predetermined voltage level.

An amplifier circuit 22 (first amplifier circuit) is a circuit for amplifying a difference between the hall signals VH1 and VH2 with a gain corresponding to the level of the power supply voltage VDD and outputting an output voltage V1 (first amplification signal). A gain of the amplifier circuit 22 according to an embodiment of the present invention is lowered when the power supply voltage VDD is lowered.

An amplifier circuit 23 (second amplifier circuit) is a circuit for amplifying the difference between the hall signals VH1 and VH2 with the gain according to the level of the power supply voltage VDD, to output an output voltage V2 (second amplification signal) opposite in phase to the output voltage V1. In an embodiment according to the present invention, the gain of the amplifier circuit 23 is also lowered according to drop in the power supply voltage VDD similarly to the gain of the amplifier circuit 22.

In the operational amplifier 24A, the output voltage V2 is applied to a positive input terminal thereof, while the output voltage V1 is applied to a negative input terminal thereof through the resistor 25A. Between the output of the operational amplifier 24A and the terminal OUT1, the inverter 27A and an inverter made up of the NMOS transistor 28A and the PMOS transistor 29A are connected. Therefore, the driving voltage VOUT1 is changed with the same polarity as the output of the operational amplifier 24A. The driving voltage VOUT1 to be applied to the terminal OUT1 is fed back to the negative input terminal of the operational amplifier 24A through the resistor 26A. Thus, the driving voltage VOUT1 is negative feedback controlled by the operational amplifier 24A, the inverter 27A, and the inverter made up of the NMOS transistor 28A and the PMOS transistor 29A. Therefore, in an embodiment of the present invention, the driving voltage VOUT1 is a voltage obtained by amplifying the difference between the output voltages V1 and V2 with the gain determined by the resistors 25A and 26A.

The inverter 27A is a buffer for driving the NMOS transistor 28A and the PMOS transistor 29A according to the output of the operational amplifier 24A.

The NMOS transistor 28A and the PMOS transistor 29A are transistors for directly driving the motor coil L. A source electrode of the NMOS transistor 28A is connected to a ground GND, and a source electrode of the PMOS transistor 29A is connected to the power supply voltage VDD. Therefore, the driving voltage VOUT1 is controlled within a range from the ground GND to the power supply voltage VDD. In an embodiment according to the present invention, it is assumed that the gain determined by the resistors 25A and 26A is set sufficiently great so that the driving voltage VOUT1 is saturated at the power supply voltage VDD when it is increased and the voltage is saturated at the ground GND when it is decreased.

The operational amplifier 24B, the resistors 25B, 26B, the inverter 27B, the NMOS transistor 28B, and the PMOS transistor 29B provided on the terminal OUT2 side have the same configuration as that on the terminal OUT1 side, except that the operational amplifier 24B is opposite to the operational amplifier 24A in input relation of the output voltages V1 and V2 output from the amplifier circuits 22 and 23. Therefore, in an embodiment according to the present invention, the driving voltage VOUT2 is a voltage obtained by amplifying the difference between the output voltages V1 and V2 with the gain determined by the resistors 25B and 26B. Since the input relation of the output voltages V1 and V2 to the operational amplifier 24B is opposite to that thereof to the operational amplifier 24A, the driving voltage VOUT2 is opposite in phase to the driving voltage VOUT1. In an embodiment according to the present invention, the gain determined by the resistors 25A and 26A is set to be the same as the gain determined by the resistors 25B and 26B. The operational amplifier 24A, the resistors 25A, 26A, the inverter 27A, the NMOS transistor 28A, and the PMOS transistor 29A as well as the operational amplifier 24B, the resistors 25B, 26B, the inverter 27B, the NMOS transistor 28B, and the PMOS transistor 29B in an embodiment according to the present invention correspond to drive circuits, respectively.

Figure 2:
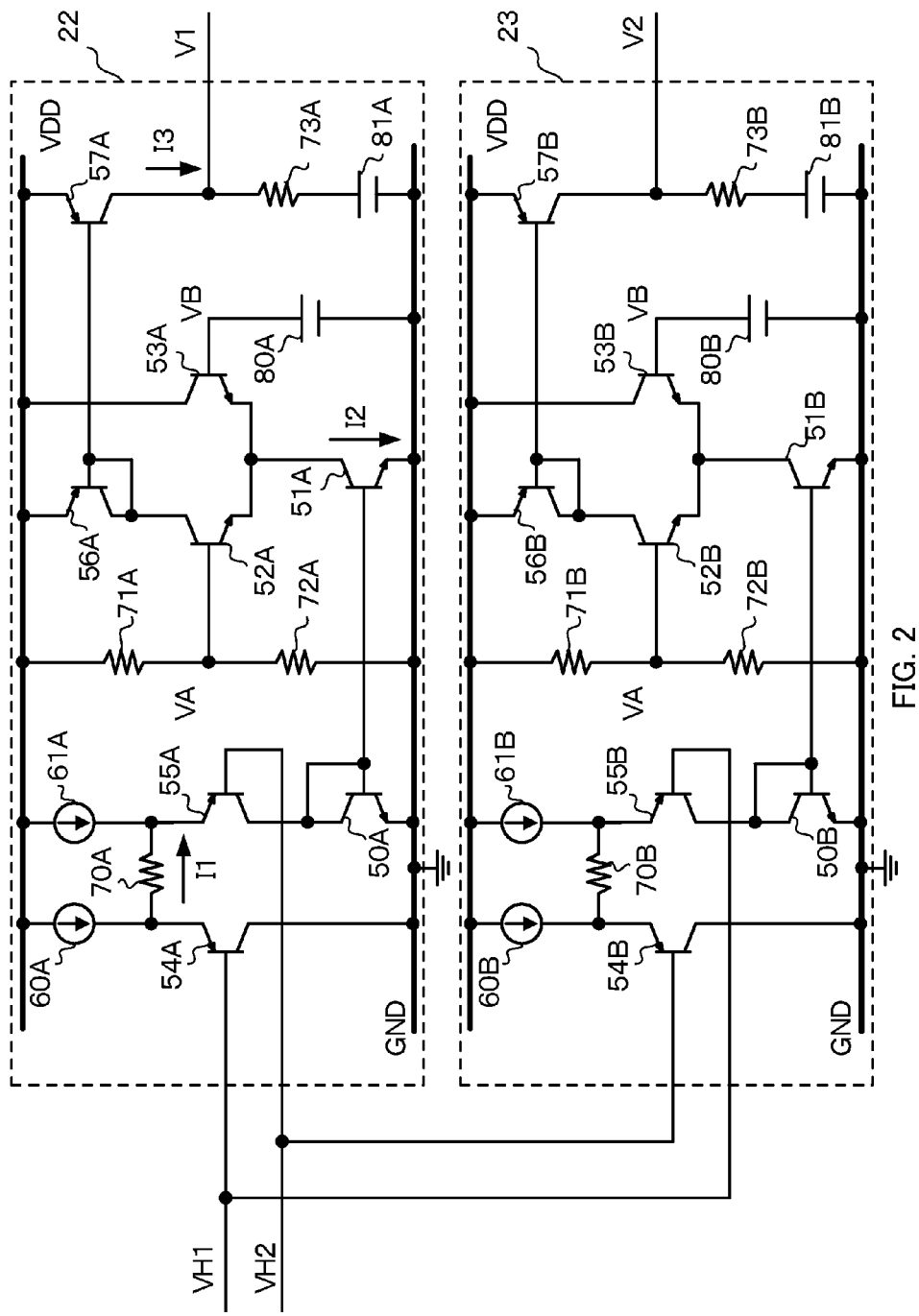
FIG. 2 is a diagram illustrating configurations of amplifier circuits 22 and 23 according to an embodiment of the present invention.

FIG. 2 is a diagram illustrating an embodiment of the amplifier circuits 22 and 23. The amplifier circuit 22 includes NPN transistors 50A to 53A, PNP transistors 54A to 57A, current sources 60A, 61A, resistors 70A to 73A, and voltage sources 80A, 81A.

The PNP transistors 54A, 55A, the current sources 60A, 61A, and the resistor 70A make up a differential input circuit, and thus, a current I1 (first current) corresponding to the difference between the hall signals VH1, VH2 and a resistance value of the resistor 70A flows through the resistor 70A. The current I1 is supplied to the diode-connected NPN transistor 50A, and since the NPN transistor 50A and the NPN transistor 51A constitute a current mirror circuit, a current I2 (first bias current) corresponding to the current I1 flows through the NPN transistor 51A. That is, the sum of a current flowing through the NPN transistors 52A and a current flowing through the NPN transistors 53A is the first bias current I2. The NPN transistors 52A and 53A make up a differential input circuit having the current I2 flowing through the NPN transistor 51A as a bias current.

A voltage obtained by dividing the power supply voltage VDD with the resistors 71A and 72A is applied to a base electrode of the NPN transistor 52A (first transistor), and a predetermined bias voltage from a voltage source 80A is applied to a base electrode of the NPN transistor 53A (second transistor). In an embodiment according to the present invention, assuming that a voltage of the base electrode of the NPN transistor 52A is VA and a voltage of the base electrode of the NPN transistor 53A is VB, when the voltage VA and the voltage VB are equal, a half of the current I2, i.e., I2/2, flows through each of the NPN transistors 52A and 53A. When the voltage VA is higher than the voltage VB, a current greater than I2/2 flows through the NPN transistor 52A, and when the voltage VA is lower than the voltage VB, a current smaller than I2/2 flows through the NPN transistor 52A. Therefore, in an embodiment according to the present invention, when the power supply voltage VDD is lowered, a current flowing through the NPN transistor 52A is decreased. The current flowing through the NPN transistor 52A flows through the diode-connected PNP transistor 56A. Since the PNP transistors 56A and 57A constitute a current mirror circuit, a current I3 (first output current) corresponding to the current I2 and the power supply voltage VDD flows through the PNP transistor 57A. Then, the current I3 is current-voltage converted at the resistor 73A (first conversion circuit), to become the output voltage V1. The current I3 is also lowered according to the drop in the power supply voltage VDD similarly to the current flowing through the NPN transistor 52A. Therefore, the amplifier circuit 22 amplifies the difference between the hall signals VH1 and VH2 opposite in phase to each other with the voltage gain which decreases according to the in the power supply voltage VDD, to output the output voltage V1. In an embodiment according to the present invention, a voltage source 81A is a voltage source for determining a bias voltage when the output voltage V1 is supplied to the operational amplifiers 24A and 24B.

The amplifier circuit 23 includes NPN transistors 50B to 53B, PNP transistors 54B to 57B, current sources 60B, 61B, resistors 70B to 73B, and voltage sources 80B, 81B. The amplifier circuit 23 has the same configuration as that of the amplifier circuit 22, except that the hall signal VH1 is input to a base electrode of the PNP transistor 55B, and the hall signal VH2 is input to a base electrode of the PNP transistor 54B. That is, the NPN transistors 50B to 53B, the PNP transistors 54B to 57B, the current sources 60B, 61B, the resistors 70B to 73B, and the voltage sources 80B, 81B correspond to the NPN transistors 50A to 53A, the PNP transistors 54A to 57A, the current sources 60A, 61A, the resistors 70A to 73A, and the voltage sources 80A, 81A, respectively. In an embodiment according to the present invention, the NPN transistors 50B to 53B and the PNP transistors 54B to 57B are of the same size as the NPN transistors 50A to 53A and the PNP transistors 54A to 57A, respectively, and the resistors 70B to 73B are of the same resistance value as the resistors 70A to 73A. Moreover, it is assumed that the current sources 60B and 61B have the same current value as that of the current sources 60A and 61A, and the voltage sources 80B and 81B have the same voltage value as that of the voltage sources 80A and 81A. Therefore, the amplifier circuit 23 amplifies the difference between the hall signals VH1 and VH2 opposite in phase to each other with the voltage gain corresponding to the power supply voltage VDD, to be output to the output voltage V2 which is opposite in phase and equal in amplitude to the output voltage V1.

In an embodiment of the present invention, the PNP transistors 54A, 55A, the current sources 60A, 61A, and the resistor 70A correspond to a first current generation circuit; the NPN transistors 50A to 53A, the PNP transistors 56A, 57A, the resistors 71A, 72A, and the current source 80A correspond to a first output current generation circuit; the NPN transistors 50A, 51A correspond to a first bias current generation circuit; and the PNP transistors 56A, 57A correspond to a first generation circuit, respectively. Also, in an embodiment of the present invention, the PNP transistors 54B, 55B, the current sources 60B, 61B, and the resistor 70B correspond to a second current generation circuit; the NPN transistors 50B to 53B, the PNP transistors 56B, 57B, the resistors 71B, 72B, and the current source 80B correspond to a second output current generation circuit; the resistor 73B corresponds to a second conversion circuit; NPN transistors 50B, 51B correspond to a second bias current generation circuit; and the PNP transistors 56B, 57B correspond to a second generation circuit, respectively. The NPN transistor 52B corresponds to a third transistor, and the NPN transistor 53B corresponds to a fourth transistor. The sum of a current flowing through the NPN transistors 52B and a current flowing through the NPN transistors 53B becomes a second bias current, to flow through the NPN transistor 51B. A current corresponding to the second bias current and the power supply voltage VDD flows through the PNP transistor 57B as a second output current opposite in phase to the current I3.

Figure 3:
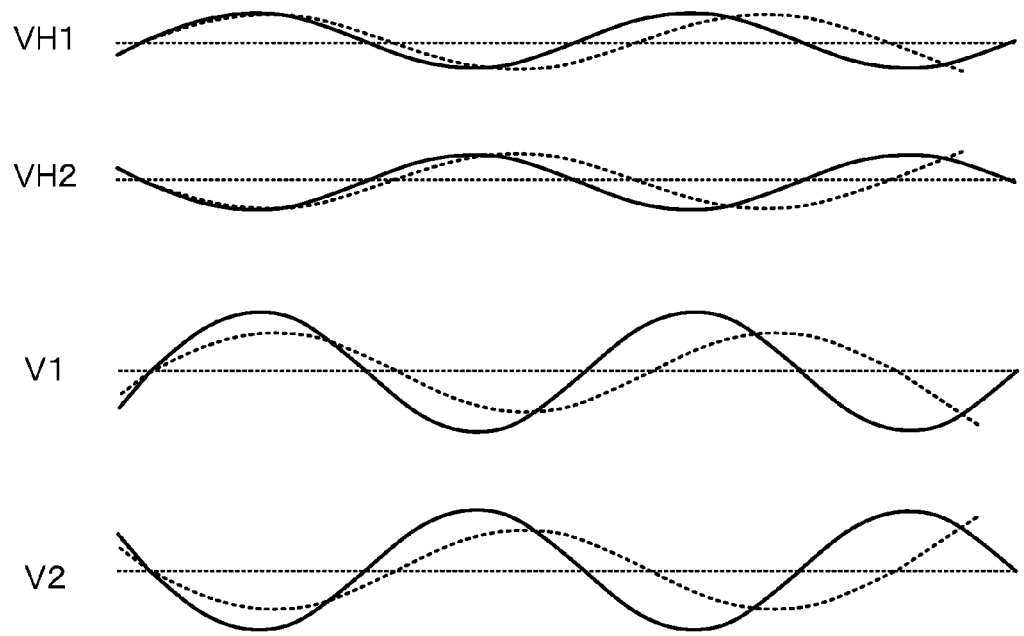
FIG. 3 is a diagram for explaining an operation of the motor drive circuit 10.
Figure 3:
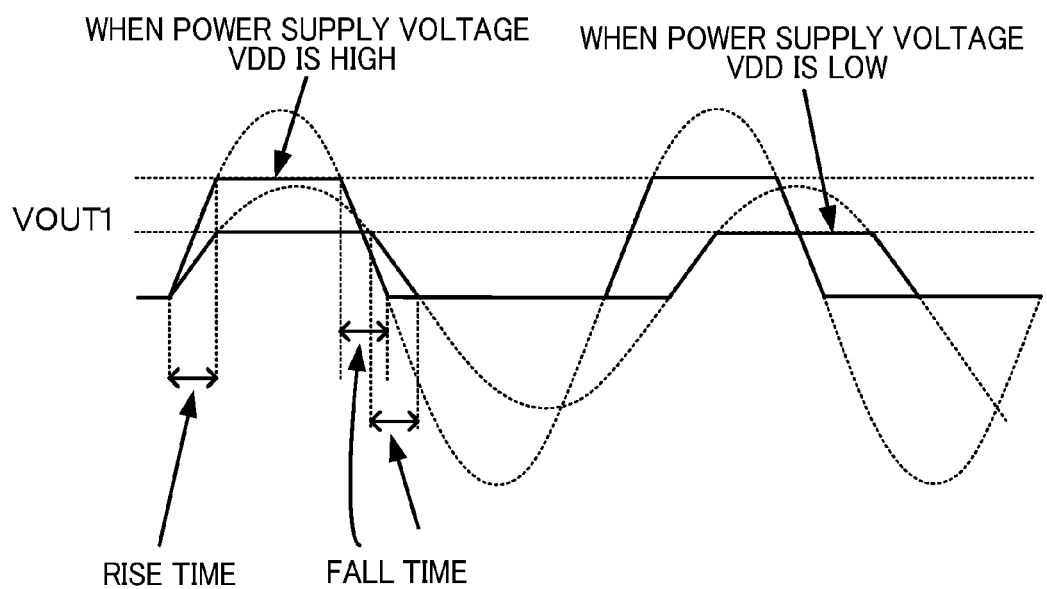
Figure 4:
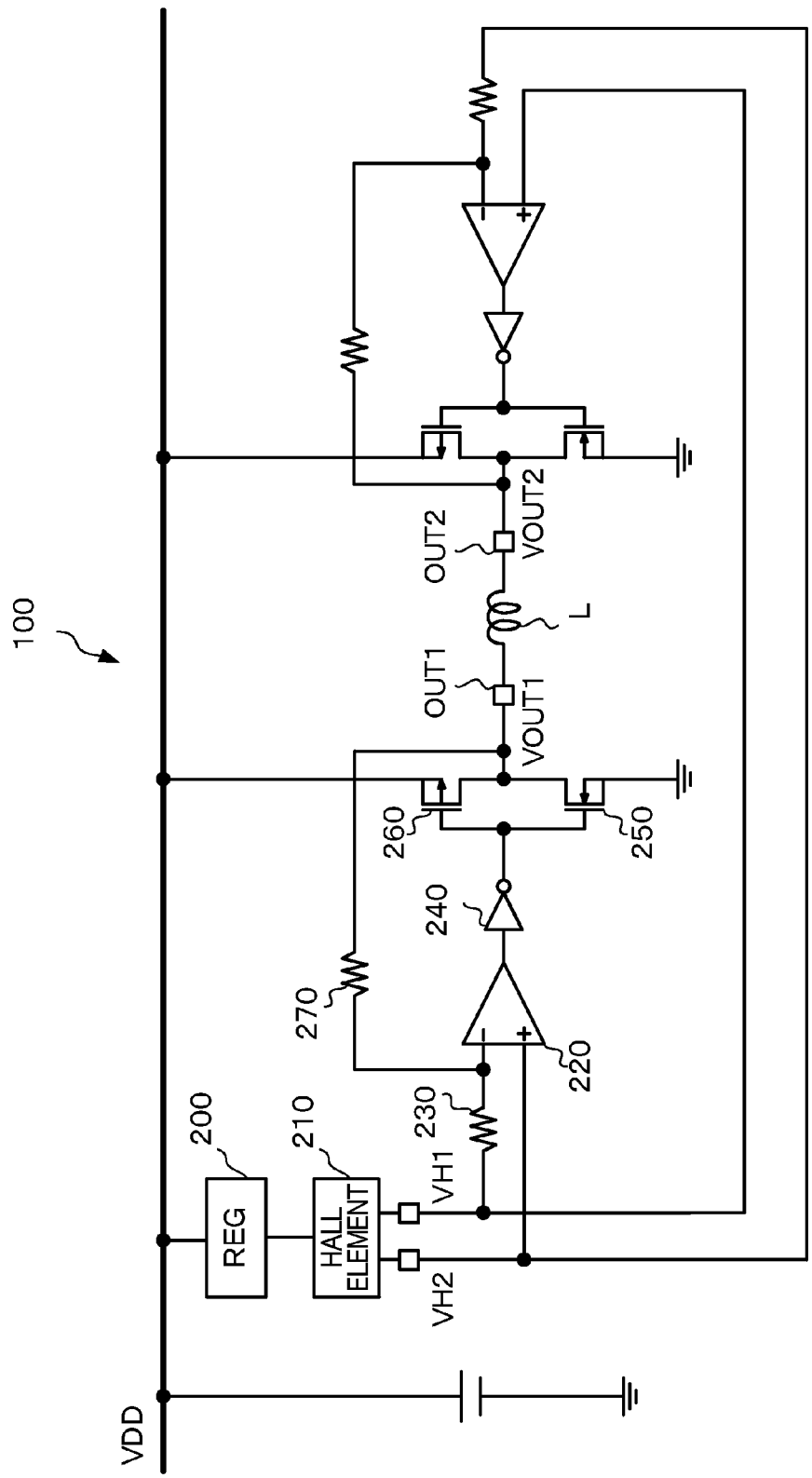
FIG. 4 is a diagram illustrating a configuration of a general motor drive circuit 100.
Figure 5:
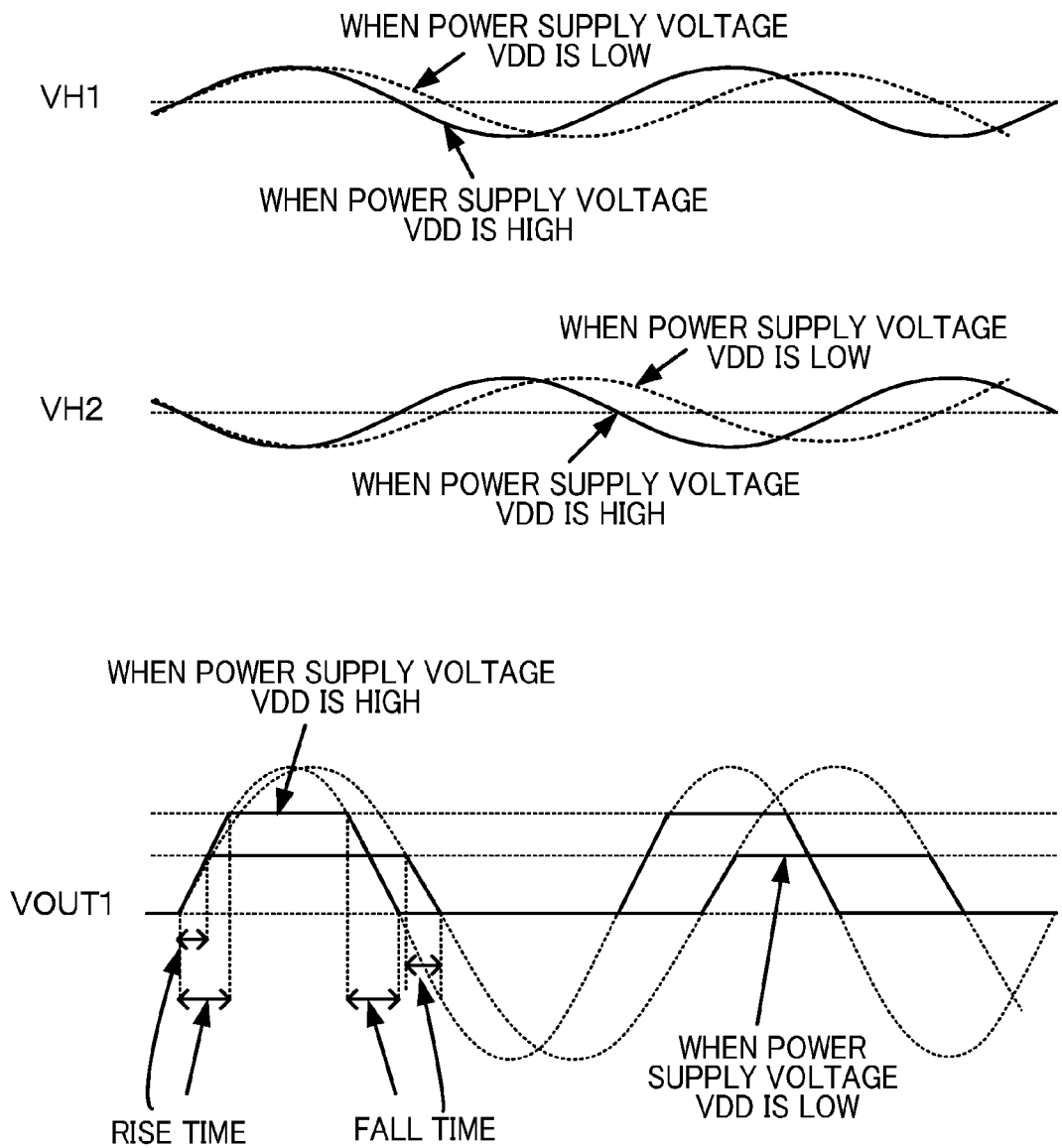
FIG. 5 is a diagram illustrating an operation of the motor drive circuit 100.

Here there will be described, with reference to FIG. 3, an operation of the motor drive circuit 10 when the power supply voltage VDD is lowered in order to decrease the fan rotation speed. In each of the hall signals VH1 and VH2 and the output voltages V1 and V2 in FIG. 3, a solid line indicates a waveform when the power supply voltage VDD is high, and a dotted line indicates a waveform when the power supply voltage VDD is low. If the power supply voltage VDD is lowered, the driving voltages VOUT1 and VOUT2 become smaller as mentioned above, and thus, the rotation speed of the fan motor is lowered. As a result, the hall signals VH1 and VH2 with a period longer than that in the case where the power supply voltage VDD is high are output from the hall element 21. Since the amplifier circuit 22 amplifies the difference between the hall signals VH1 and VH2 with the gain which becomes smaller as the power supply voltage VDD is lowered, the amplitude of the output voltage V1 becomes small. Similarly, the amplitude of the output voltage V2 from the amplifier circuit 23 also becomes smaller according to the drop in the power supply voltage VDD. Since the driving voltage VOUT1 becomes a voltage obtained by amplifying the difference between the output voltages V1 and V2 with a predetermined gain according to the ratio between the resistors 25A and 26A, the maximum level thereof to be saturated is lowered and rise and fall thereof become gentle, when the power supply voltage VDD is lowered. Since the driving voltage VOUT2 is opposite in phase to the driving voltage VOUT1, the maximum level thereof to be saturated is lowered and rise and fall thereof become gentle as well, when the power supply voltage VDD is lowered.

In the motor drive circuit 10 according to an embodiment of the present invention with a configuration as mentioned above, the amplifier circuits 22 and 23 amplify the difference between the hall signals VH1 and VH2 with the gain which becomes smaller according to the drop in the power supply voltage VDD, to output the output voltages V1 and V2. The driving voltage VOUT1 for driving the motor coil L becomes the voltage obtained by amplifying the difference between the output voltages V1 and V2 with the predetermined gain on the basis of the ratio between the resistors 25A and 26A, so as to be saturated at the power supply voltage VDD. As a result of this, when the power supply voltage VDD is lowered, the rise and fall become gentle in the driving voltage VOUT1. In an embodiment according to the present invention, if the driving voltage VOUT1 is at the level of the intermediate voltage VDD/2 of the power supply voltage VDD, for example, the NMOS transistor 28A and the PMOS transistor 29A are both turned on. Therefore, if the power supply voltage VDD becomes higher, the consumption current when the NMOS transistor 28A and the PMOS transistor 29A are both turned on is increased. However, if the power supply voltage VDD is raised in the motor drive circuit 10, the gain of the amplifier circuit 22 is increased contrary to the above, and the rise and fall in the driving voltage VOUT1 become sharp. Therefore, time can be reduced during which the NMOS transistor 28A and the PMOS transistor 29A are both turned on, and the consumption current can be suppressed. In an embodiment according to the present invention, as mentioned above, when the power supply voltage VDD is changed, change can be suppressed of the proportion of the rise time and fall time of the driving voltage VOUT1. Therefore, in the motor drive circuit 10 according to an embodiment of the present invention, noise can be reduced and the consumption current can be suppressed, when the power supply voltage VDD is changed in order to change the rotation speed of the fan motor.

Moreover, in the amplifier circuit 22 according to an embodiment of the present invention, the difference between the hall signals VH1 and VH2 is converted into the current I1, and the current I3 corresponding to the current I1 is made smaller according to the drop in the power supply voltage VDD. Then, the current I3 is voltage-converted 3 at the resistor 73A, to change the voltage gain. In this way, the voltage gain of the amplifier circuit 22 is made smaller according to the drop in the power supply voltage VDD. On the other hand, when the power supply voltage VDD is raised, the voltage gain of the amplifier circuit 22 is increased contrary to the above. Therefore, in an embodiment according to the present invention, when the power supply voltage VDD is changed, the change can be suppressed of the proportion of the rise time and fall time in the driving voltage VOUT1.

In the amplifier circuit 22, the voltage obtained by dividing the power supply voltage VDD with the resistors 71A and 72A and the voltage of the voltage source 80A for generating a predetermined voltage are compared at a differential circuit made up of the NPN transistors 52A and 53A with the bias current of the current I2. As a result of this, when the power supply voltage VDD is changed, the current corresponding to the power supply voltage VDD out of the current I2 can be passed through the NPN transistor 52A. By making a configuration as above, the amplitude of the output voltage V1 can consequently be made small when the power supply voltage VDD is lowered. On the other hand, when the power supply voltage VDD is raised, the amplitude of the output voltage V1 is increased. Therefore, in an embodiment according to the present invention, when the power supply voltage VDD is changed, the change can be suppressed of the proportion of the rise time and fall time in the driving voltage VOUT1.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. A motor drive circuit comprising:
a first amplifier circuit configured to amplify a difference between first and second position detection signals with a gain becoming smaller according to drop in power supply voltage, to output a first amplification signal, the first and second position detection signals being signals indicating a rotational position of a rotor in a motor, having a frequency corresponding to a rotation speed of the motor, and being opposite in phase to each other;
a second amplifier circuit configured to amplify the difference between the first position detection signal and the second position detection signal with the gain, to output a second amplification signal opposite in phase to the first amplification signal; and
a drive circuit configured to amplify the difference between the first amplification signal and the second amplification signal with a predetermined gain so as to be saturated at the power supply voltage, to output a driving voltage for driving the motor.

2. The motor drive circuit according to claim 1, wherein the first amplifier circuit includes:
a first current generation circuit configured to generate a first current according to the difference between the first position detection signal and the second position detection signal;
a first output current generation circuit configured to generate a first output current changing according to a current value of the first current and decreasing according to the drop in the power supply voltage; and
a first conversion circuit configured to current-voltage convert the first output current into the first amplification signal that is a voltage signal; and wherein the second amplifier circuit includes:
a second current generation circuit configured to generate a second current opposite in phase to the first current, according to the difference between the first position detection signal and the second position detection signal;
a second output current generation circuit configured to generate a second output current changing according to a current value of the second current, decreasing according to the drop in the power supply voltage, and being opposite in phase to the first output current; and
a second conversion circuit configured to current-voltage convert the second output current into the second amplification signal that is a voltage signal.

3. The motor drive circuit according to claim 2, wherein the first output current generation circuit includes:
a first transistor having a control electrode thereof to be applied with a voltage corresponding to the power supply voltage;
a second transistor having a control electrode thereof to be applied with a predetermined voltage lower than the power supply voltage;
a first bias current generation circuit configured to generate a first bias current, which is the sum of a current flowing through the first transistor and a current flowing through the second transistor, and which is a current changing according to the current value of the first current; and
a first generation circuit configured to generate the first output current, on the basis of a current decreasing according to the drop in the power supply voltage out of the current flowing through the first transistor and the current flowing through the second transistor, and the second output current generation circuit includes:
a third transistor having a control electrode thereof to be applied with a voltage corresponding to the power supply voltage;
a fourth transistor having a control electrode thereof to be applied with a predetermined voltage lower than the power supply voltage;
a second bias current generation circuit configured to generate a second bias current, which is the sum of a current flowing through the third transistor and a current flowing through the fourth transistor, and which is a current changing according to the current value of the second current; and
a second generation circuit configured to generate the second output current, on the basis of a current decreasing according to the drop in the power supply voltage out of the current flowing through the third transistor and the current flowing through the fourth transistor.

* * * * *